United States Patent [19]
Williamson

[11] 4,090,637
[45] May 23, 1978

[54] DISPENSER FOR CONICAL CONTAINER

[76] Inventor: Donald Farrington Williamson, 16 Shasta Drive, Thornhill, Canada

[21] Appl. No.: 714,039

[22] Filed: Aug. 13, 1976

[51] Int. Cl.[2] .......... B65G 59/00
[52] U.S. Cl. .......... 221/92; 221/310
[58] Field of Search .......... 221/92, 307, 310

[56] References Cited

U.S. PATENT DOCUMENTS

| | | | |
|---|---|---|---|
| 1,373,986 | 4/1921 | Soldami | 221/310 X |
| 3,168,214 | 2/1965 | Breazeale | 221/310 X |

*Primary Examiner*—Allen N. Knowles

[57] ABSTRACT

A dispenser for conical articles such as ice cream cones and the like in which a plurality of tubular columns are arranged above an open-fronted enclosure, with container restraining means arranged at the base of each column, permitting a portion of each container to extend through the retaining means into the open-fronted enclosure from which the container may be grasped and drawn downwardly through the restraining means, and removed from the enclosure, and in which the storage columns are provided with means extending between adjacent said storage columns to provide mutual support between adjacent columns, and in which the columns are mounted on an upper mounting plate having holes therein registering with the base of a respective column, the upper mounting plate being attached to the top of the open-sided enclosure, and with the restraining means being sandwiched between the said top of said enclosure and said upper mounting plate whereby to partially obstruct each of said holes in said upper mounting plate.

6 Claims, 2 Drawing Figures

DISPENSER FOR CONICAL CONTAINER

The present invention relates to a dispenser for dispensing conical containers, and is particularly adapted for the dispensing of ice cream cones and the like.

Conical containers such as ice cream cones are usually stored in columns, partially telescoped one within the other. Various forms of dispensing devices or storage racks have been proposed for carrying such columns of containers so that they may be stored in an efficient and hygienic manner and can be dispensed one by one as required for use. However, the design of such dispensers and racks has usually been such that the manufacturing costs were relatively high and the end cost to the actual user was such as to severely restrict their use.

The invention therefore seeks to provide an improved dispenser for conical articles such as ice cream cones and the like in which a plurality of tubular columns are arranged above an open-fronted enclosure, with container restraining means arranged at the base of each column, permitting a portion of each container to extend through the retaining means into the open-fronted enclosure from which the container may be grasped and drawn downwardly through the restraining means, and removed from the enclosure, and in which the storage columns are provided with means extending between adjacent said storage columns to provide mutual support between adjacent columns, and in which the columns are mounted on an upper mounting plate having holes therein registering with the base of a respective column, the upper mounting plate being attached to the top of the open-sided enclosure, and with the restraining means being sandwiched between the said top of said enclosure and said upper mounting plate whereby to partially obstruct each of said holes in said upper mounting plate.

More particularly, it is an objective of the invention to provide a dispenser having the foregoing advantages provided with front and rear banks of columns, and mutual supporting means extending between such front and rear banks.

More particularly, it is an objective of the invention to provide a dispenser in which each of the banks of columns is made of two sheets of thermo-plastic material formed with semi-cylindrical formations spaced apart from one another, the two said sheets being then fastened together with said semi-cylindrical formations in registration with said semi-cylindrical formations in registration with one another to provide spaced apart cylindrical columns, joined together by mutually supporting webs between said columns.

The foregoing and other advantages will become apparent from the following description of a preferred embodiment of the invention which is given here by way of example only with reference to the following drawings.

DESCRIPTION OF A SPECIFIC EMBODIMENT

Figure 1:
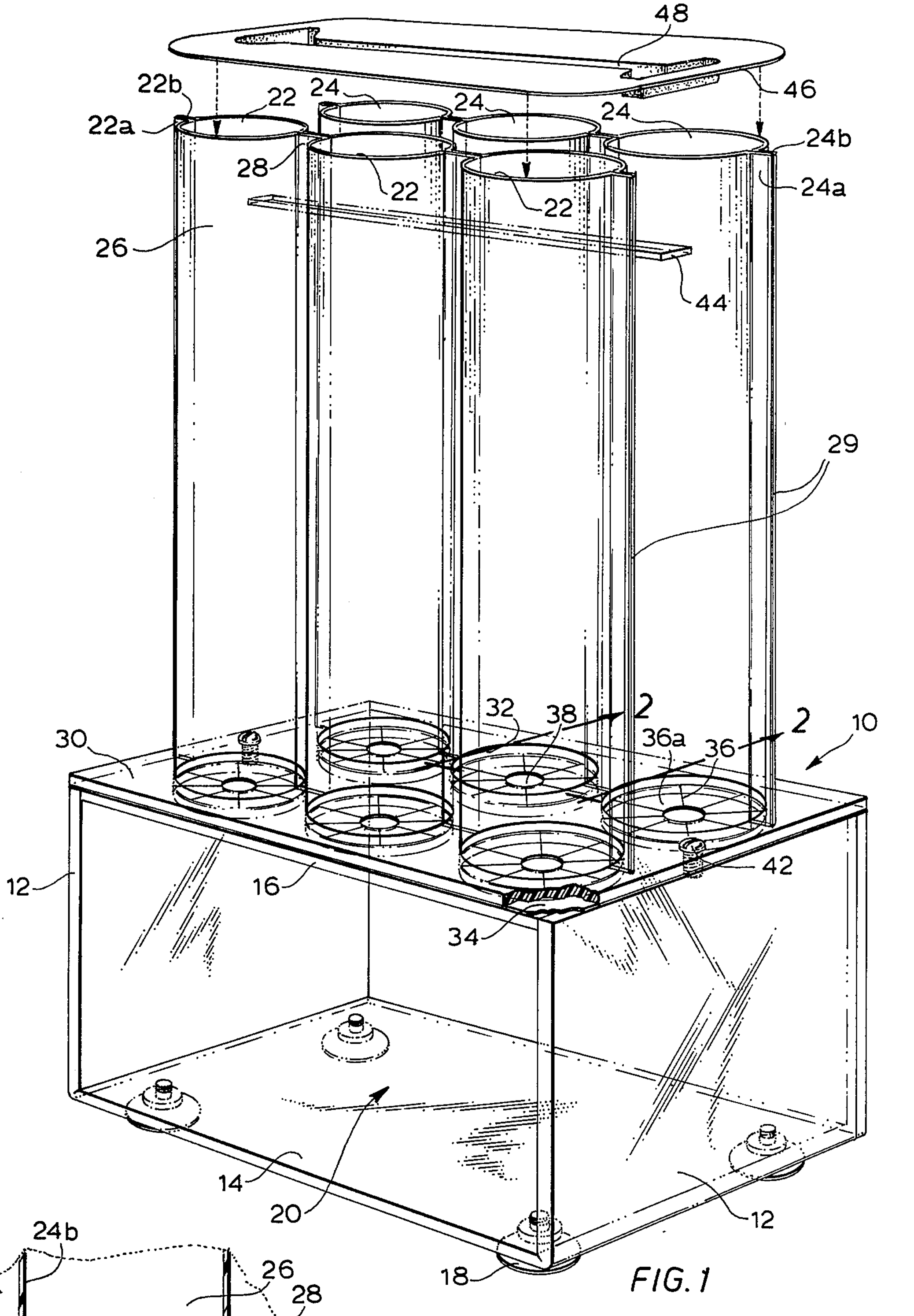
FIG. 1 is an upper-front perspective illustration of a dispenser according to the invention partially cut away to reveal its construction.
Figure 2:
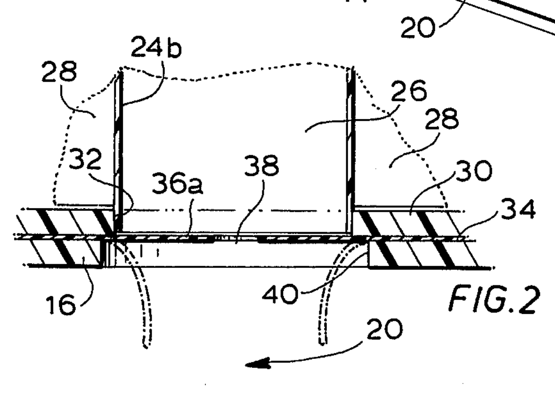
FIG. 2 is a section along the line 2—2 of FIG 1.

Referring now to the illustrations it will be seen that this preferred embodiment of the invention comprises a generally rectangular box-like housing 10 having integral side walls 12 and a bottom wall 14 formed of a single piece of thermo-plastic material, and a top wall 16 bonded to the side walls 12 in any suitable manner as for example by adhesive or heat welding or the like. The housing 10 may also be provided with a back wall (not shown) to give it further rigidity, or any other suitable bracing means.

Preferably, non-skid feet 18, for example rubber suction cups or the like, will be provided on the bottom wall 14. The front of the housing defines a rectangular opening 20 giving access to the interior of the housing. It will of course be appreciated that the dimensions of the housing 10 are such that a hand may readily be inserted through the opening 20 for removal of a container in a manner to be described below.

In order to store the conical containers, in this case ice cream cones, two banks of tubular storage columns indicated as the front bank 22 and the rear bank 24 are provided. The columns forming the banks 22 and 24, according to the invention, provide mutual support for one another for greater strength. This mutual support may be achieved in a variety of ways. In the present embodiment, each of the banks of columns 22 and 24 are formed of two complementary sheets *22a* and *22b* and *24a* and *24b* respectively. Each of such sheets is formed with three parallel spaced apart semi-cylindrical formations 26, and intervening mutually supporting webs 28, and side edge flange portions 30. The respective pairs of sheets *22a* and *22b*, and *24a* and *24b*, respectively are bonded together for example by adhesive, or by heat sealing or the like along their respective webs 28 and edge flanges 29, so as to constitute cylindrical storage columns 22 and 24 as shown.

In this way the webs provide support for the columns in each bank and greatly increase the strength of the structure.

Advantageously the thermo-plastic may be transparent so as to facillitate refilling the columns.

At the base of each of the columns 22 and 24, the semi-cylindrical formations 26 are extended downwardly and are fastened in an upper mounting plate 30. The mounting plate 30 is provided with suitable openings 32 dimensioned so as to receive and support the lowermost portions of the tubular extensions 26, which may be fastened in position therein by any suitable means such as adhesive or heat sealing or the like.

The container retaining means is provided in the form of a sheet of flexible plastic material 34, sandwiched between the upper mounting plate 30 and the top 16 of the housing 10. The flexible sheet 34 is provided with groups of radially disposed incisions 36, radiating from respective openings 48, arranged in registration with respective openings 32 in the upper mounting plate 30, forming flexible fingers *36a*.

The top 16 of the housing 10 is furthermore provided with registering openings 40, registering with the opening 32 in the mounting plate 30. The openings 40 are of a greater diameter than the openings 32 so as to permit greater freedom of flexibility for the sheet 34. The upper mounting plate 30, and the flexible sheet 34 may held in position on the top 16 of housing 10, for example by screws 42.

In order to provide for greater stability, and mutual support between the columns 22 and 24, a transverse supporting bar 44 is provided, which may be fastened to the respective sheets *22b* and *24a* by any suitable means such as adhesive or heat sealing, towards the upper end of the columns 22 and 24, in this way providing for much greater rigidity and mutual support between the columns 22 and 24.

In order to maintain hygiene requirements, any suitable top closure may be provided to exclude dirt or other falling debris from the columns 22 and 24, such as the top plate 46, which is provided with a central longitudinal identation 48 adapted to make a snug fit between the sheets 22*b* and 24*a* of the columns 22 and 24 respectively.

In operation, containers such as ice cream cones (not shown) may be loaded into the columns 22 and 24 from the top ends, and the closure plate 46 will be applied when they are filled.

During filling, the lowermost cone or container will protrude partially through the fingers 36*a*, and opening 38 of the sheet 34, the fingers being sufficiently resilient to restrain passage of the containers entirely through the openings 32 and 40, under their own weight.

When an ice cream cone is required, the operator can then simply insert his hand through the open front 20 of the housing 10, grasp the lower portion of an ice cream cone and pull it downwardly. The fingers 36*a* of the sheet 34 will then flex so as to permit such downward movement, and then will snap back against the sides of the next ice cream cone in the column and retain it in position ready for dispensing.

As noted above, the opening 40 in the top 16 is preferably somewhat greater in diameter than the opening 32 in the mounting plate 30, which is in itself somewhat greater than the internal diameter of the columns 22 or 24. Thus the fingers 36*a* extend for a length considerably greater than the actual diameter of the container, in this case an ice cream cone, which is to be passed through the fingers 36*a*. In this way, it is not necessary for the fingers 36*a* to flex to the same extent as would be required if the opening 40 were only of the same diameter as the internal diameter of the columns 22 and 24 for example.

In this way, the fingers 36*a* will achieve a much greater working life.

It will of course be appreciated that various changes may be made without departing from the scope of the invention. For example, the feet 18 may be eliminated and the entire device may be mounted on a wall or a countertop as a virtually permanent fixture.

The mutual support between the columns 22 and 24 may be constituted in various ways, for example the webs may extend from front to back between adjacent columns 22 and 24, or additional webs might be provided extending the edge flanges 30 of the columns 22 and 24 to provide a box like structure, and conceivably, the entire structure could be made with rectangular columns in an egg box fashion, while still carrying out the principle of providing mutual support between adjacent storage columns. It will therefore be appreciated that the embodiment of the invention as illustrated merely represents a preferred form of construction which is illustrative of the invention, but is not limiting, and the invention is not to be taken as limited to any of the specific features of such embodiment as described above, but comprehends all such variations as come within the scope of the appended claims.

What is claimed is:

1. A dispenser for conical articles such ice cream cones and the like of the type having a plurality of storage columns for said articles arranged above an open-fronted enclosure with a portion of the lowermost article extending into the open-fronted enclosure from which the articles may be grasped and drawn downwardly and removed from the enclosure, and in which the improvement comprises: at least one row of such columns, each such row being formed of two sheets of synthetic thermoplastic material shaped with parallel semi-cylindrical formations extending therealong, and webs of said material extending between said semi-cylindrical formations, said two sheets being fastened together with said semi-cylindrical formations in registration with one another to form said columns, and said webs extending between adjacent columns and providing mutual support, and article restraining means at the lower end of the columns.

2. A dispenser as claimed in claim 1 including a mounting plate having holes formed therein registering with the base of respective columns, the columns being attached thereto in registration with the respective said holes, and the mounting plate being attached to the top of said open-sided enclosure.

3. A dispenser as claimed in claim 1 wherein said article restraining means comprise flexible finger members extending at least partially across the bottom of said columns, and adapted to deflect when a said article is grasped and drawn downwardly therethrough, and flexing back again to engage and restrain the next said article in said column.

4. A dispenser as claimed in claim 1 including a column mounting plate having holes formed therein registering with the base of respective columns, the columns being attached thereto in registration with the respective said holes, and wherein said open fronted enclosure includes a top, and including holes formed in said top in registration with said holes formed in said mounting plate, said mounting plate and said top being attached one above the other, and wherein said article restraining means comprises a sheet of flexible synthetic material sandwiched between said mounting plate and said top, and having flexible finger members formed in radial groups in registration with said holes in said mounting plate whereby to at least partially obstruct said holes, and being sufficiently flexible to permit a said article to be drawn downwardly therethrough and flexing back again to engage the next said article in said column.

5. A dispenser as claimed in claim 4 wherein the holes formed in said top of said open fronted enclosure have a larger diameter than the holes in said mounting plate whereby to permit said fingers to be extended beyond the interior diameter of the holes on said mounting plate.

6. A dispenser as claimed in claim 4 including two said rows of said columns, and including a bar member fastened between said rows of columns.

* * * * *